(12) United States Patent
Widebrant

(10) Patent No.: US 10,051,524 B2
(45) Date of Patent: Aug. 14, 2018

(54) SYNCHRONIZATION OF SETTINGS FOR SUPPLEMENTARY SERVICES

(71) Applicant: Telefonaktiebolaget LM Ericsson (publ), Stockholm (SE)

(72) Inventor: Anders Widebrant, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/125,170

(22) PCT Filed: Mar. 14, 2014

(86) PCT No.: PCT/EP2014/055163
§ 371 (c)(1),
(2) Date: Sep. 11, 2016

(87) PCT Pub. No.: WO2015/135595
PCT Pub. Date: Sep. 17, 2015

(65) Prior Publication Data
US 2017/0078925 A1   Mar. 16, 2017

(51) Int. Cl.
*H04W 36/00* (2009.01)
*H04W 4/16* (2009.01)
(Continued)

(52) U.S. Cl.
CPC ......... *H04W 36/0022* (2013.01); *H04L 69/18* (2013.01); *H04W 4/16* (2013.01); *H04W 36/0016* (2013.01); *H04W 36/04* (2013.01)

(58) Field of Classification Search
CPC ......... H04W 36/14; H04W 4/14; H04W 8/08; H04W 36/0022; H04W 88/06; H04W 88/18; H04W 36/24; H04W 36/00; H04W 48/14; H04W 48/18; H04W 4/00; H04W 4/20; H04W 88/12; H04W 8/205;
(Continued)

(56) References Cited

U.S. PATENT DOCUMENTS

2008/0020776 A1   1/2008   Deshpande et al.
2009/0323563 A1   12/2009  Noda et al.
(Continued)

OTHER PUBLICATIONS

3GPP TS 29.011 V11.0.0, dated Dec. 2011.*
(Continued)

*Primary Examiner* — Daniel Lai
(74) *Attorney, Agent, or Firm* — Leffler Intellectual Property Law, PLLC

(57) ABSTRACT

A method performed by a wireless communication device (UE) adapted to operate in association with a cellular communication network supporting supplementary services is disclosed. The UE is adapted to configure settings of the supplementary services offered by a first type of cell using a first communication protocol, i.e. a layer 3 protocol as specified in 3GPP TS 24.010, in a first list, to configure settings of the supplementary services offered by a second type of cell using a second communication protocol, i.e. a XCAP protocol as specified in 3GPP TS 24.623, in a second list and to keep a third list of settings of the supplementary services used to synchronize the first and second lists when the UE switches from the first type of cell to the second type of cell.

15 Claims, 4 Drawing Sheets

(51) Int. Cl.
*H04L 29/06* (2006.01)
*H04W 36/04* (2009.01)

(58) Field of Classification Search
CPC ......... H04W 36/0016; H04W 36/0066; H04W 36/0083; H04W 36/04; H04W 4/16; H04L 69/18
See application file for complete search history.

(56) References Cited

U.S. PATENT DOCUMENTS

| | | | | |
|---|---|---|---|---|
| 2010/0222034 | A1* | 9/2010 | Islam | H04M 3/42 455/414.1 |
| 2013/0194976 | A1* | 8/2013 | Choi | H04L 12/66 370/259 |
| 2014/0301273 | A1* | 10/2014 | Rameil-Green | H04L 67/1002 370/328 |
| 2015/0017966 | A1* | 1/2015 | Kaura | H04W 4/001 455/418 |

OTHER PUBLICATIONS

PCT International Search Report, dated Nov. 21, 2014, in connection with International Application No. PCT/EP2014/055163, all pages.
PCT Written Opinion, dated Nov. 21, 2014, in connection with International Application No. PCT/EP2014/055163, all pages.
Anonymous: mysql—Sync 2 tables: one with engine—Memory another with engine = InnoDB—Stack Overflow, Jan. 15, 2014, 2 pages.
3GPP TS 24.167 V 12.1.0 (Dec. 2013); 3rd Generation Partnership Project; Technical Specification Group Core Network and Terminals; 3GPP IMS Management Object (MO); Stage 3 (Release 12), 40 pages.
3GPP TS 24.623 V12.7.0 (Dec. 2015); 3rd Generational Partnership Project; Technical Specification Group Core Network and Terminals; Extensible Markup Language (XML) Configuration Access Protocol (XCAP) over the Ut interface for Manipulating Supplementary Services (Release 12), 21 pages.
3GPP TS 24.010 V12.0.0 (Sep. 2014); 3rd Generation Partnership Project; Technical Specification Group Core Network and Terminals; Mobile radio interface layer 3; Supplementary services specification; General aspects (Release 12), 31 pages.
GSM Association, Official Document IR.92—IMS Profile for Voice and SMS, Version 9.0, Apr. 8, 2015, 40 pages.
3GPP TR 23.883 V 9.0.0 (Jun. 2009); 3rd Generation Partnership Project; Technical Specification Group Services and Architecture; Study on enhancements to IMS Centralized Services (ICS) (Release 9), 17 pages.
3GPP TSG CT WG1 Meeting #84, C1-132970, Vienna (Austria), Aug. 5-9, 2013, Domain for supplementary services configuration, 2 pages.
3GPP TSG CT WG1 Meeting #84, C1-132745, Vienna (Austria), Aug. 5-9, 2013, Clarifying supplementary service configuration, 4 pages.

* cited by examiner

SYNCHRONIZATION OF SETTINGS FOR SUPPLEMENTARY SERVICES

TECHNICAL FIELD

The present invention relates generally to the field of supplementary services of a wireless communication system. More particularly, it relates to settings for supplementary services.

BACKGROUND

A wireless communication standard (e.g. the Third Generation Partnership Project—3GPP) may typically specify a set of supplementary services used to enhance the basic services offered to wireless communication devices (also denoted herein as devices or terminals) operating in networks applying the standard. The supplementary services may typically be configured in different ways by a user of the device. As an example, the supplementary service "call forwarding" enhances the basic voice call service of a device, and the user may configure under what conditions, and to which number, incoming calls should be forwarded.

In the example of 3GPP, there was initially only one option for configuration of supplementary services. This first option is defined as a layer three (L3) radio protocol in 3GPP Technical Specification (TS) 24.010 (see e.g. version 11.0.0).

With the introduction of IMS (Internet protocol (IP) Multimedia Subsystem) and subsequently of VoLTE (Voice over LTE (Long Term Evolution)), 3GPP added a packet-switched option for configuration of supplementary services. This second option is based on the XCAP XML-over-HTTP protocol (where XCAP stands for XML (Extensible Markup Language) Configuration Access Protocol and HTTP stands for HyperText Transfer Protocol) and is defined in 3GPP TS 24.623 (see e.g. version 11.1.0). See also GSMA PRD IR.92 (GMS (Global System for Mobile communication) Association Permanent Reference Document IR.92, e.g. version 7.0 of Mar. 3, 2013) for more information regarding IMS and VoLTE.

For simplicity, these two protocols will also be referred to herein as "24.010" and "XCAP", respectively.

The XCAP-based supplementary services were designed to mirror the functionality already available in 24.010-based supplementary services, but the two protocols were not designed to be used together. In particular, while some wireless communication devices are designed to be able to use any of the two protocols for supplementary services configuration, the network node(s) implementing 24.010-based supplementary services configuration is typically not adapted to also handle XCAP-based supplementary services configuration (and vice versa for the network node(s) implementing XCAP-based supplementary services configuration).

Thus, networks that support both 24.010 and XCAP will store supplementary service settings in two separate network nodes, which may or may not be geographically separated. This scenario illustrated in FIG. 1, where three wireless communication devices 110, 120, 130 are illustrated while operating in connection with a wireless communication network (NW) 100, e.g. an IMS network.

The device 110 is adapted to configure supplementary services using a first protocol (e.g. 24.010-based) as illustrated by 111, and the corresponding supplementary service settings are stored by the network 100 in a first network node 140.

The device 130 is adapted to configure supplementary services using a second protocol (e.g. XCAP-based) as illustrated by 131, and the corresponding supplementary service settings are stored by the network 100 in a second network node 150.

The device 120 is adapted to configure supplementary services using any of the first and second protocols, and the corresponding supplementary service settings are stored by the network 100 in the first or second network node as applicable depending on which protocol was used.

To ensure backwards compatibility for older devices, it is typically expected that wireless communication networks that support XCAP-based configuration of supplementary services also continues to support 24.010-based configuration, at least for the foreseeable future. Similarly, newer devices that are adapted to use XCAP-based configuration of supplementary services will typically also support 24.010-based configuration, at least while there are wireless communication networks where XCAP-based configuration is not supported.

In some deployments of wireless communication networks (where a particular deployment may, for example be by a particular operator), XCAP-based configuration may only be supported in parts of the network and/or 24.010-based configuration may only be supported in parts of the network. Other parts of the network may support both XCAP-based configuration and 24.010-based configuration. The various parts referred to above may, for example, be geographical parts.

For example, it may not be possible to use XCAP-based configuration for a device currently associated with a network cell that does not support data traffic. Another example where it may not be possible to use XCAP-based configuration is when a device is currently associated with a network cell that does not allow a secondary data connection to the operator's internal network.

In such deployments—where the support regarding which protocol (e.g. XCAP and/or 24.101) is possible to use for supplementary services configuration varies throughout the network—a device that supports both protocols will typically have to switch between different protocols when performing cell switches (e.g. re-selection or handover) between cells with different supplementary services configuration support.

This, together with the fact that supplementary service settings related to different protocols are stored in separate network nodes, results in that a device may have different supplementary service settings related to it, each configured using a respective protocol and stored in a respective network node. From the user perspective, this situation will cause unexpected and/or unwanted behavior. For example, the user typically expects operation according to the latest supplementary services configuration, while actual operation may be in accordance with an earlier supplementary services setting due to a switch being made after the latest configuration between cells with different support of configuration protocols.

C1-132970 "Domain for supplementary services configuration", by Qualcomm Incorporated, 3GPP TSG CT WG1 meeting #84, Vienna, Austria, Aug. 5-9, 2013 recognizes a need to synchronize the supplementary services settings between CS (circuit switched) and PS (packet switched) domain and that such synchronization lead to additional network complexity.

US 2013/0194976 A1 discloses a method of interworking a packet network and a circuit network with regard to supplementary services.

At present, there is no standardized mechanism available to synchronize supplementary services settings stored in the network node associated with XCAP-configuration with those stored the network node associated with 24.010-configuration, or vice versa. Furthermore, any potential such mechanism typically increases the complexity of the network. In addition, network updates will typically be required for the implementation of such mechanisms.

Therefore, there is a need for methods and arrangements for supplementary services configuration with desired performance in network deployments where different cells of the network support different selections of protocols for configuration. An example desired performance comprises that a latest configuration of supplementary services should, preferably, apply.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements for supplementary services configuration with desired performance in any network deployment.

According to a first aspect, this is achieved by a method of a wireless communication device adapted to operate in association with a cellular communication network supporting supplementary services.

The wireless communication device is adapted to configure settings of the supplementary services using a first communication protocol, and the cellular communication network comprises a first network node adapted to store (for one or more cells of a first type of the cellular communication network) a first list of settings of the supplementary services configured using the first communication protocol.

The wireless communication device is also adapted to configure settings of the supplementary services using a second communication protocol, and the cellular communication network comprises a second network node adapted to store (for one or more cells of a second type of the cellular communication network) a second list of settings of the supplementary services configured using the second communication protocol.

The method comprises keeping (in the wireless communication device) a third list of settings of the supplementary services configured by the wireless communication device and synchronizing the second list with the third list when the wireless communication device switches from a cell of the first type to a cell of the second type.

Similarly, the method may also comprise synchronizing the first list with the third list when the wireless communication device switches from a cell of the second type to a cell of the first type according to some embodiments.

The first and second network node may or may not be geographically and/or functionally separated in some embodiments.

In some embodiments, synchronizing the second list with the third list may comprise replacing the second list with the third list. Replacing the second list with the third list may, for example, comprise sending a replacement message indicative of the settings of the third list to the second network node. In some examples, replacing the second list with the third list may also comprise receiving a replacement response message indicative of whether or not the second list has been replaced by the third list from the second network node. According to some embodiments, the settings of the third list may be replaced by the corresponding settings of the second list if that setting of the second list has not been replaced by the setting of the third list.

According to some embodiments, synchronizing the second list with the third list may comprise receiving the second list of settings from the second network node and comparing the settings of the second list with the settings of the third list. For each setting of the second list that is not equal to the corresponding setting of the third list the method may comprise updating the setting of the second list at the second network node to equal the setting of the third list or updating the setting of the third list to equal the setting of the second list.

Updating the setting of the third or second list may be performed in one update procedure per setting of the second list that is not equal to the corresponding setting of the third list. Alternatively, several or all settings of the second list that is not equal to the corresponding settings of the third list are updated in a single procedure.

In some embodiments, updating the setting of the third or second list may comprise sending a setting synchronization message indicative of the setting of the third list to the second network node, receiving a setting synchronization response message from the second network node indicative of whether or not the setting of the second list has been updated to equal the setting of the third list, and updating the setting of the third list to equal the setting of the second list if the setting of the second list has not been updated to equal the setting of the third list.

According to some embodiments, the method may comprise rendering (via a user interface) a notification indicative of the updated the setting of the third list, if the setting of the third list is updated to equal the setting of the second list.

Keeping the third list of settings may, according to some embodiments, comprise (when the wireless communication device is operating in association with a cell of the first type) sending a setting update message indicative of a new setting of the supplementary services to the first network node, receiving a setting update response message from the first network node indicative of whether or not the setting of the first list has been updated to equal the new setting, and updating the setting of the third list to equal the new setting if the setting of the first list has been updated to equal the new setting. The new setting may, for example, be entered by a user of the wireless communication device via a user interface.

The setting update message, the synchronization message, the replacement message, the setting update response message, the synchronization response message and the replacement response message may or may not be conventional messages related to supplementary services configuration. Furthermore, one or more of the setting update message, the synchronization message and the replacement message may or may not be implemented as a same message. Similarly, one or more of the setting update response message, the synchronization response message and the replacement response message may or may not be implemented as a same message.

In some embodiments, keeping the third list of settings comprises (when the wireless communication device initiates operation in association with the cellular communication network supporting supplementary services and when the wireless communication device is operating in association with a cell of the first type) receiving the first list of settings from the first network node and initiating the settings of the third list to equal the settings of the first list.

It should be noted that any aspects, embodiments or examples described above in relation to the first communication protocol, the first network node, the first type, and/or the first list may be similarly described (and are equally applicable) in relation to the second communication protocol, the second network node, the second type, and/or the second list, and vice versa.

According to some embodiments, the first communication protocol may be an Extensible Markup Language, XML, Configuration Access Protocol—XCAP—protocol as defined in Technical Specification 24.623 (e.g. version 11.1.0) of the Third Generation Partnership Project and the second communication protocol may be a layer three radio protocol for configuration of supplementary services as defined in Technical Specification 24.010 (e.g. version 11.0.0) of the Third Generation Partnership Project, or vice versa.

A second aspect is a computer program product comprising a computer readable medium, having thereon a computer program comprising program instructions, the computer program being loadable into a data-processing unit and adapted to cause the data-processing unit to execute the method according to the first aspect when the computer program is run by the data-processing unit.

A third aspect is an arrangement for a wireless communication device adapted to operate in association with a cellular communication network supporting supplementary services.

The cellular communication network comprises a first network node adapted to store (for one or more cells of a first type of the cellular communication network) a first list of settings of the supplementary services configured by the wireless communication device using a first communication protocol.

The cellular communication network also comprises a second network node adapted to store (for one or more cells of a second type of the cellular communication network) a second list of settings of the supplementary services configured by the wireless communication device using a second communication protocol.

The arrangement comprises a supplementary services control unit adapted to cause configuration of settings of the supplementary services by use of the first communication protocol and configuration of settings of the supplementary services by use of the second communication protocol.

The supplementary services control unit is also adapted to cause keeping (in a storage unit) of a third list of settings of the supplementary services configured by the wireless communication device and synchronization of the second list with the third list when the wireless communication device switches from a cell of the first type to a cell of the second type.

In some embodiments, the supplementary services control unit may be adapted to cause synchronization of the second list with the third list by causing a transceiver to receive the second list of settings from the second network node and comparing the settings of the second list with the settings of the third list. For setting of the second list that is not equal to the corresponding setting of the third list, the supplementary services control unit may be adapted to cause updating of the setting of the second list at the second network node to equal the setting of the third list or updating of the setting of the third list to equal the setting of the second list.

The supplementary services control unit may, according to some embodiments, be adapted to update the setting of the third or second list by causing the transceiver to send a setting synchronization message indicative of the setting of the third list to the second network node, causing the transceiver to receive a setting synchronization response message from the second network node indicative of whether or not the setting of the second list has been updated to equal the setting of the third list, and updating the setting of the third list to equal the setting of the second list if the setting of the second list has not been updated to equal the setting of the third list.

The supplementary services control unit may, in some embodiments, be further adapted to (if the setting of the third list is updated to equal the setting of the second list) cause rendering, via a user interface, a notification indicative of the updated the setting of the third list.

In some embodiments, the supplementary services control unit may be further adapted to (when the wireless communication device is operating in association with a cell of the first type) cause the transceiver to send a setting update message indicative of a new setting of the supplementary services to the first network node, cause the transceiver to receive a setting update response message from the first network node indicative of whether or not the setting of the first list has been updated to equal the new setting, and update the setting of the third list to equal the new setting if the setting of the first list has been updated to equal the new setting.

According to some embodiments, the supplementary services control unit may be further adapted to (when the wireless communication device initiates operation in association with the cellular communication network supporting supplementary services and when the wireless communication device is operating in association with a cell of the first type) cause the transceiver receive the first list of settings from the first network node, and initiate the settings of the third list to equal the settings of the first list.

According to some embodiments, the arrangement may further comprise one or more of the storage unit, the transceiver, and the user interface.

A fourth aspect is a wireless communication device comprising the arrangement according to the third aspect.

In some embodiments, the third and fourth aspects may additionally have features identical with or corresponding to any of the various features as explained above for the first aspect.

It should be noted that although XCAP-based and 24.010-based configuration of supplementary services in 3GPP-based systems are used throughout this disclosure as an illustrative example, embodiments may be equally applicable to other situations where the above-identified problem related to supplementary service settings (or a similar problem) occurs.

An advantage of some embodiments is that a user of a device is presented with an experience related to supplementary services that is consistent with assumed expectations. This is true even when the applicable network deployment comprises two (or more) uncoordinated storages of settings for supplementary services.

Other advantages of some embodiments include that no network updates are required, that no synchronization is required in the network, and/or that there is no increase in network complexity.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
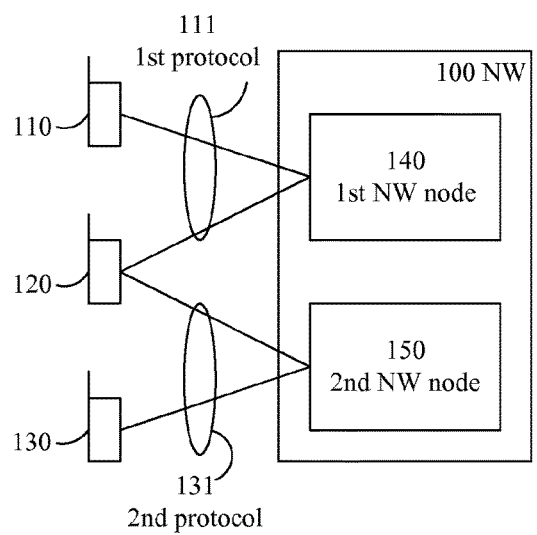
FIG. 1 is a schematic drawing illustrating a scenario according to some embodiments.

In the following, embodiments for synchronization of supplementary services settings will be described.

For simplicity, the term "setting(s)" will be used interchangeably with the equivalent terms "supplementary services setting(s)" and "setting(s) of the supplementary services". Similarly, the term "protocol" will be used interchangeably with the term "communication protocol". As mentioned above, XCAP-based and 24.010-based configuration of supplementary services in 3GPP-based systems are used throughout this disclosure as an illustrative, but non-limiting, example.

Embodiments disclosed herein aim at addressing the problems identified above (e.g. conflicting network sessions due to different protocols for supplementary services configuration) by keeping and maintaining an authoritative list of supplementary service configuration settings in the wireless communication device. As will be seen in the following, the entries of the authoritative list typically comprise the settings input by the user, possibly with the constraint that the settings have also been accepted by the network.

In a typical embodiment, the device—when it performs a cell switch that leads to a new protocol domain (XCAP-based or 24.010-based)—attempts to update the settings kept in the network node relevant for the new protocol domain so that they match the settings of the authoritative list. For example, the device may retrieve the settings of the network node and compare them to the settings of the authoritative list to determine if there are any discrepancies and send an update message to the network node indicative of settings with discrepancies.

For the settings that are not successfully updated (e.g. not accepted by the network node), the device typically informs the user of the device of the discrepancy (e.g. via rendering on a user interface). In some embodiments, the authoritative list may also be updated to match the settings kept in the network node for the settings that where not successfully updated in the network node. In other embodiments, the discrepancy is maintained so that the authoritative list always comprises the settings entered by the user.

By continuously updating settings in this way, the device may implement a supplementary services synchronization mechanism, ensuring (at least to a very large extent) that the XCAP-based and 24.010-based nodes of the network contain the same supplementary services settings.

A new protocol domain may be considered to be entered when switching from a cell that supports only one (first) protocol to a cell that supports only another (second) protocol. When switching from a cell that supports only the first protocol to a cell that supports both the first and second protocols, it may be considered that a new protocol domain (that of the second protocol) is entered according to some embodiments. In alternative embodiments, it may be considered that a new protocol domain (that of the second protocol) is not entered until switching from the cell that supports both the first and second protocol to a cell that supports only the second protocol. Other possibilities for definition of entering a new protocol domain may also be envisioned. In the wording of the summary, a cell supporting only the first protocol is a cell of a first type and a cell supporting only the second protocol is a cell of a second type. A cell supporting both the first and second protocol may be defined as a cell of the first type or as a cell of the second type depending on the situation.

In the context of this disclosure it is assumed that the device only considers one of the protocol domains as being active at each point in time, even if it technically may have access to both at some points in time. The conditions that determine which domain should be considered to be active may, for example, be operator-specific and/or consider various metrics such as which radio access technology is used, whether or not packet-switched data is possible, etc.

Figure 2:
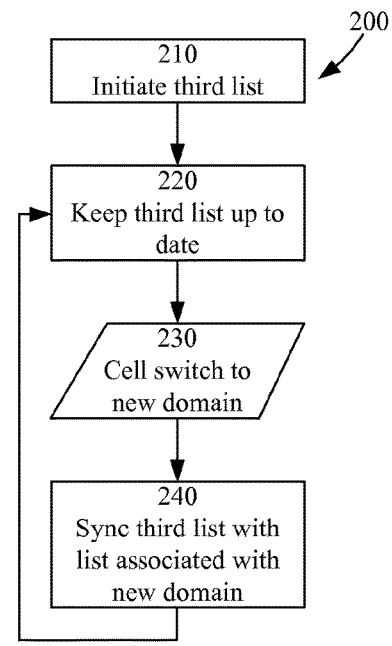
FIG. 2 is a flowchart illustrating example method steps according to some embodiments.

FIG. 2 illustrates an example method 200 of a wireless communication device (compare with the device 120 of FIG. 1) according to some embodiments.

In step 210 an authoritative list is initiated in the wireless communication device. This step may typically be performed when the device initiates operation in association with a network (e.g. at power on of the device and/or when the device performs a registration procedure to the network), and/or at other suitable points in time.

The authoritative list is also denoted the third list, as opposed to a first list of settings kept in a first network node (compare with 140 of FIG. 1) and a second list of settings kept in a second network node (compare with 150 of FIG. 1).

The initiation of the third list in step 210 may typically comprise receiving the list of settings kept by a network node relevant for the type of cell the device is currently operating in and initiating the settings of the third list to equal the settings of the received list. In some situations, one, more or all of these settings may be default settings. Alternatively or additionally, one more or all of these settings may be settings previously entered by a user of the device.

The authoritative list is kept up to date with the supplementary services configurations performed by the device as illustrated in step 220. Keeping the authoritative list up to date may, for example, comprise adjusting the settings of the list whenever a user of the device reconfigures the supplementary services.

Figure 3:
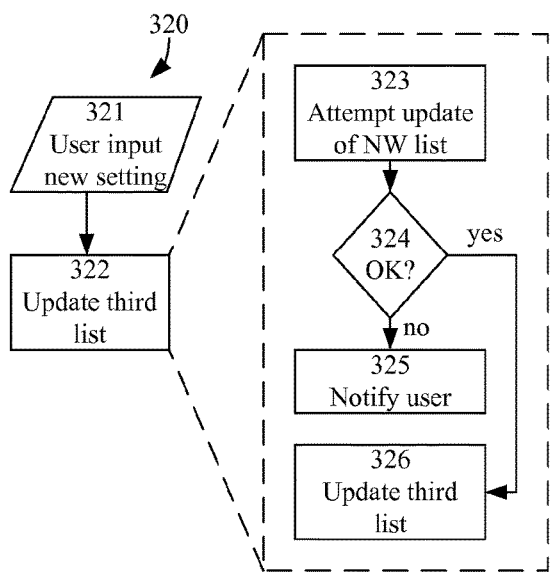
FIG. 3 is a flowchart illustrating example method steps according to some embodiments.

FIG. 3 illustrates an example procedure 320 that may be comprised in method step 220. When a user inputs a new setting as illustrated by step 321, this new setting is used to update the authoritative list as illustrated in step 322. In some embodiments, an attempt is first made to update the relevant list kept in the network based on the new setting as illustrated by step 323. This attempt may comprise sending a setting update message and receiving a setting update response message (typically acknowledgement or non-acknowledgement). If the attempt to update the list kept in the network was successful (yes-path out of step 324), the authoritative list may be updated accordingly as illustrated by step 326. If the attempt to update the list kept in the network was not successful (no-path out of step 324), the authoritative list is not updated and the user is notified as illustrated by step 325.

It should be noted that step 220 may be empty if no change of settings is initiated by the user, and that step 220 may comprise performing several setting adjustments (e.g. several executions of the method 320) if the user changes settings several times.

Whenever a cell switch entailing entering a new protocol domain happens, as illustrated by step 230, the list kept in the network in relation to the new protocol domain is synchronized with authoritative list.

Figure 4:
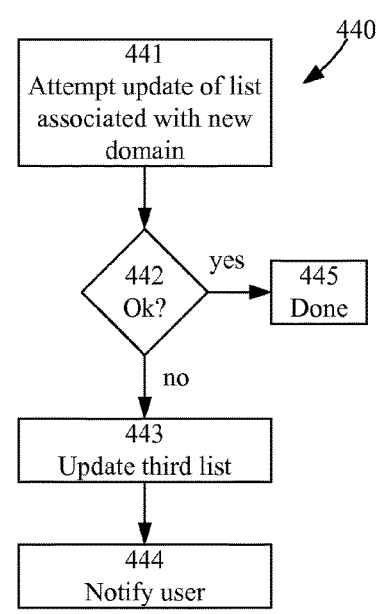
FIG. 4 is a flowchart illustrating example method steps according to some embodiments.

FIG. 4 illustrates an example procedure 440 that may be comprised in method step 240. In step 441, an attempt is made to update the list kept in the network and associated with the new protocol domain so that its settings equal the settings of the authoritative list. If the attempt to update the list kept in the network was successful (yes-path out of step 442), the synchronization is considered completed as illustrated by step 445. If the attempt to update the list kept in the network was not successful (no-path out of step 442), the authoritative list may be updated to match the list kept in the network as illustrated by optional step 443 and the user is notified as illustrated by step 444.

The attempt to update the list kept in the network may, for example, comprise sending a replacement message or setting synchronization message and receiving a corresponding response message (typically acknowledgement or non-acknowledgement). This signaling may be performed per setting or for several settings collectively. The attempt to update the list kept in the network may be applied to all settings of the authoritative list or only to settings with discrepancies between the authoritative list and the list kept in the network. Such a discrepancy may be determined by retrieving the list kept in the network and comparing it to the authoritative list.

When step 240 of FIG. 2 is completed, the method returns to step 220 where the authoritative list is kept up to date until yet a new protocol domain is entered.

Example method steps and signaling will now be described in connection to FIGS. 5A-C. The content of FIG. 5A may advantageously be compared with step 210 of FIG. 2. The content of FIG. 5B may advantageously be compared with step 220 of FIG. 2 and with method 320 FIG. 3. The content of FIG. 5C may advantageously be compared with steps 230 and 240 of FIG. 2 and with method 440 of FIG. 4.

Figure 5A:
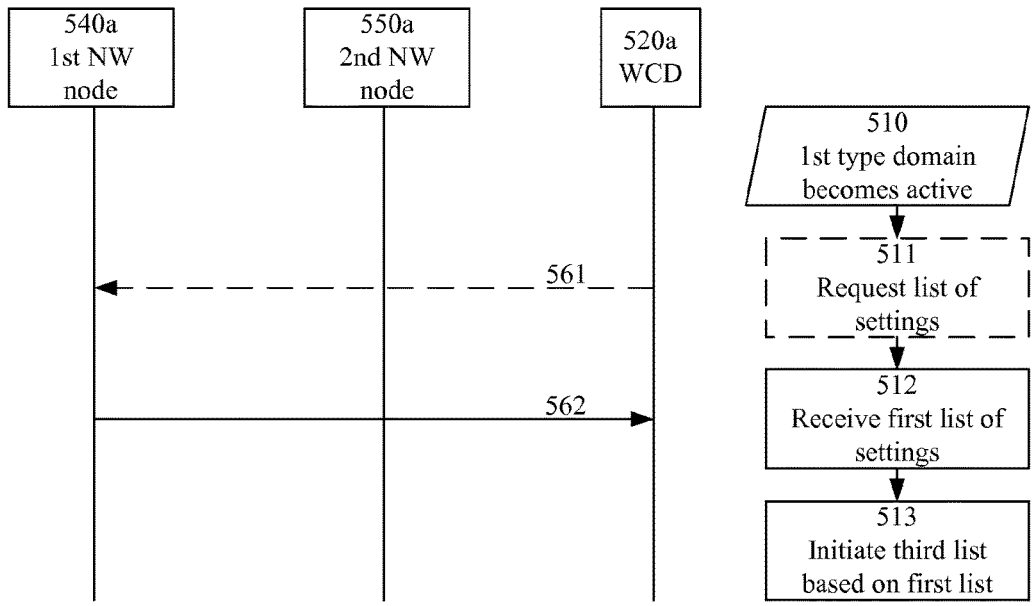
FIG. 5A is a combined flowchart and signaling diagram illustrating example method steps and signaling according to some embodiments.
Figure 5B:
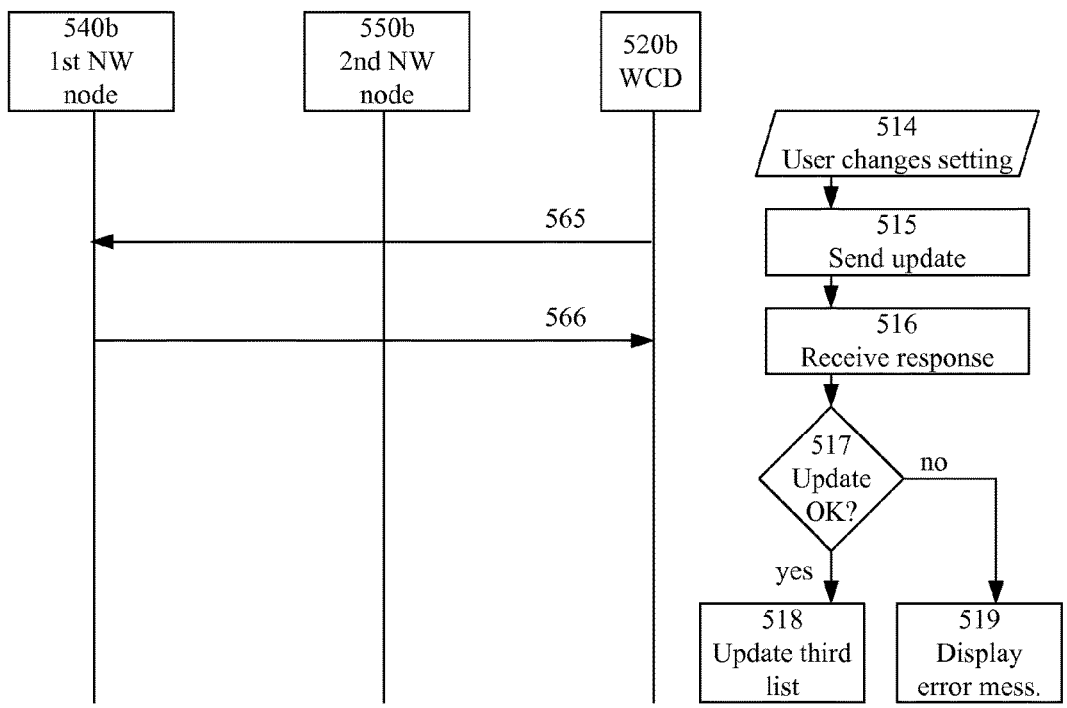
FIG. 5B is a combined flowchart and signaling diagram illustrating example method steps and signaling according to some embodiments.
Figure 5C:
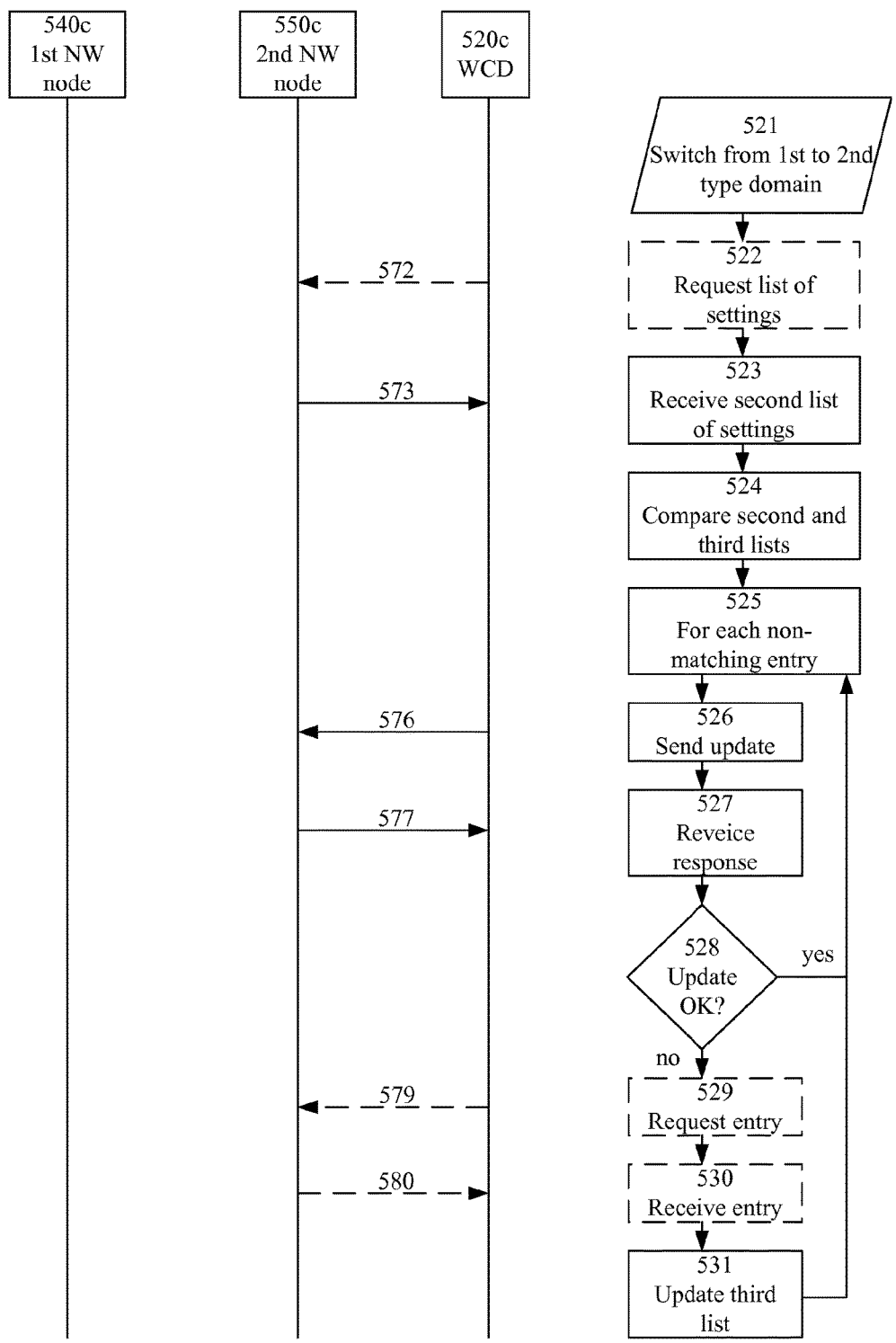
FIG. 5C is a combined flowchart and signaling diagram illustrating example method steps and signaling according to some embodiments.

The first network node (1st NW node) 540a, 540b, 540c of FIGS. 5A-C may be compared with the first network node 140 of FIG. 1. The second network node (2nd NW node) 550a, 550b, 550c of FIGS. 5A-C may be compared with the second network node 150 of FIG. 1. The wireless communication device (WCD) 520a, 520b, 520c of FIGS. 5A-C may be compared with the wireless communication device 120 of FIG. 1.

FIG. 5A illustrates example signaling and method steps associated with an initiation of the authoritative list, FIG. 5B illustrates example signaling and method steps associated with a user initiated change of settings, and FIG. 5C illustrates example signaling and method steps associated with setting synchronization when a new protocol domain is entered. These three procedures may be combined in any suitable way and may be performed in any suitable sequence, for example, as elaborated on in connection to FIG. 2.

FIG. 5A illustrates an initial settings download process, which may be performed when the wireless communication device 520a initially gains access to a protocol domain for supplementary services settings (first type domain in this example) as illustrated in step 510.

The device 520a may send a request 561 for the list of settings to the network node keeping the list associated with the relevant protocol domain (the first network node 540a in this example) as illustrated by step 511. The network node (540a in this example) responds by sending a message 562 comprising its list of settings which is received by the device 520a as illustrated by step 512. Alternatively, the network node autonomously sends the message 562 as soon as a new device enters its protocol domain, and step 511 may be discarded.

Then, the device 520a populates its internal authoritative list using the received list of settings as illustrated by step 513. Although not shown in FIG. 5A, a corresponding update of the user interface of the device may also be performed according to some examples.

FIG. 5B illustrates a process associated with a change of settings initiated by a user of the device 520b as illustrated in step 514.

The device 520b sends an update message 565 indicating the changed settings to the network node keeping the list associated with the relevant protocol domain (the first network node 540b in this example) as illustrated by step 515. The network node (540b in this example) responds by sending a message 566 indicating whether or not it has accepted and changed the settings of its list accordingly. The message 566 (typically acknowledgement or non-acknowledgement) is received by the device 520b as illustrated by step 516.

If the list of the network was updated (yes-path out from step 517), the authoritative list of the device is also updated accordingly as illustrated by step 518. If the list of the network was not updated (no-path out from step 517), the authoritative list of the device is not updated and the user is notified (e.g. via an error message displayed on a user interface) as illustrated by step 519. In cases where the user changes several settings, and the network node accepts only some of them, step 518 may be performed for the accepted settings and step 519 may be performed for the non-accepted settings.

FIG. 5C illustrates a synchronization process associated with the device 520c entering a new protocol domain for supplementary services settings (switch from first type domain to second type domain in this example) as illustrated in step 521.

The device 520c may send a request 572 for the list of settings to the network node keeping the list associated with the new protocol domain (the second network node 550c in this example) as illustrated by step 522. The network node (550c in this example) responds by sending a message 573 comprising its list of settings which is received by the device 520c as illustrated by step 523. Alternatively, the network node autonomously sends the message 573 as soon as a new device enters its protocol domain, and step 522 may be discarded.

Then, the device 520c compares its internal authoritative list with the received list of settings as illustrated by step 524 to determine discrepancies (entries where the setting of the authoritative list does not match the corresponding setting of the down-loaded list).

For each non-matching entry (step 525), the device 520c sends an update message 576 indicating the corresponding setting of the authoritative list to the network node as illustrated by step 526. The network node (550c in this example) responds by sending a message 577 indicating whether or not it has accepted and changed the setting of its list accordingly. The message 577 (typically acknowledgement or non-acknowledgement) is received by the device 520c as illustrated by step 527.

If the list of the network was updated (yes-path out from step 528), the process continues with the next non-matching entry (if any). If the list of the network was not updated (no-path out from step 528), the authoritative list of the device is updated in stead so that the corresponding entries of the internal authoritative list and the received list of settings match as illustrated by step 531. Optionally, the user may be notified of the new changes in the authoritative list (e.g. via a message displayed on a user interface) in connection to step 531. Thereafter, the process continues with the next non-matching entry (if any).

In some implementations, the updating of the authoritative list in step 531 may be preceded by the device 520c sending a separate request 579 for the setting of the network list where the update was not accepted as illustrated by step 529. The network node may respond by sending a message 580 comprising the setting, which is received by the device 520c as illustrated by step 530.

The synchronization process illustrated in FIG. 5C ensures that network settings in the new protocol domain matches the previously active one to as large extent as possible (i.e. as accepted by the network).

I should be noted that the signaling of FIGS. 5A-C is schematically illustrated to highlight the function achieved. Hence, the signaling between the device 520a-c and the respective network node 540a-c, 550a-c may, in an actual implementation, comprise more messages that those shown in the figures (which is the case for, e.g. XCAP-based and 24.010-based protocols.

Figure 6:
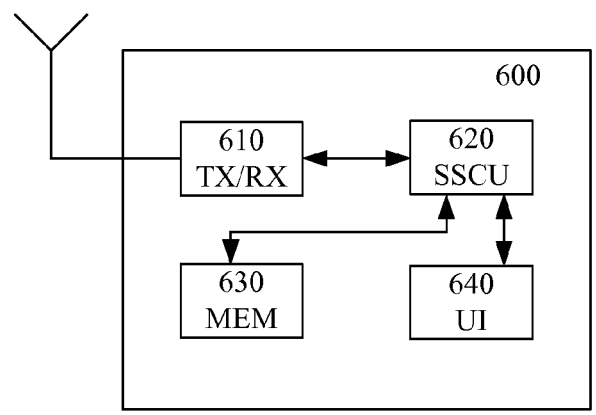
FIG. 6 is a block diagram illustrating an example arrangement according to some embodiments.

FIG. 6 schematically illustrates an arrangement 600 according to some embodiments. The arrangement may be comprised in a wireless communication device and may be adapted to perform any of the methods shown in FIGS. 2, 3, 4, and 5A-C.

The arrangement 600 comprises a supplementary services control unit (SSCU) 620 adapted to cause configuration of settings of the supplementary services by use of any of at least two protocols as elaborated on above.

The supplementary services control unit 620 is also adapted to cause keeping—in a storage unit (MEM) 630—of an authoritative (third) list of settings of the supplementary services configured by the wireless communication device.

Furthermore, the supplementary services control unit 620 is adapted to cause synchronization of a relevant list kept by the network with the authoritative list as has already been described above.

A transceiver (TX/RX) 610 may be provided in association with the supplementary services control unit 620 for transmission and reception of various messages as has been described above.

A user interface (UI) 640 may also be provided in association with the supplementary services control unit 620 for rendering notifications and/or for entering of new settings by a user as has been described above.

According to some embodiments, the arrangement may further comprise one or more of the storage unit 630, the transceiver 610, and the user interface 640.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, or a mobile gaming device.

Figure 7:
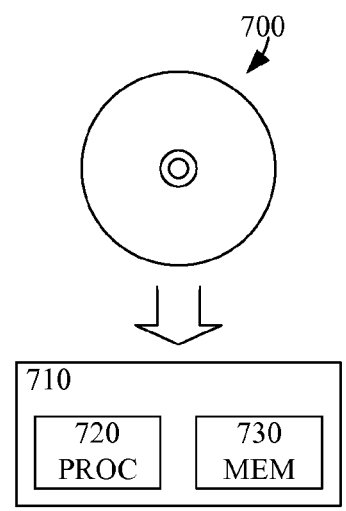
FIG. 7 is a schematic drawing illustrating a computer readable medium according to some embodiments.

According to some embodiments, a computer program product comprises a computer readable medium such as, for example, a diskette, a USB-stick, a plug-in card, an embedded drive, or a compact disc read only memory—CD-ROM (as illustrated by the CD-ROM 700 of FIG. 7). The computer readable medium may have stored thereon a computer program comprising program instructions. The computer program may be loadable into a data-processing unit 720, which may, for example, be comprised in a mobile terminal 710. When loaded into the data-processing unit, the computer program may be stored in a memory 730 associated with or integral to the data-processing unit. According to some embodiments, the computer program may, when loaded into and run by the data-processing unit, cause the data-processing unit to execute method steps according to, for example, any of the methods shown in FIGS. 2, 3, 4, and 5A-C.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a wireless communication device configured to operate in association with a cellular communication network supporting supplementary services, wherein:

the wireless communication device is configured to configure settings of the supplementary services using a first communication protocol in cooperation with the cellular communication network that comprises a first network node configured to store, for one or more cells of a first type of the cellular communication network, a first list of settings of the supplementary services configured using the first communication protocol, the wireless communication device is configured to configure settings of the supplementary services using a second communication protocol in cooperation with the cellular communication network that further comprises a second network node configured to store, for one or more cells of a second type of the cellular communication network, a second list of settings of the supplementary services configured using the second communication protocol, the method comprising:

keeping, in the wireless communication device, a third list of settings of the supplementary services configured by the wireless communication device; and attempting to synchronize the second list such that it contains substantially the same supplementary services settings as the third list when the wireless communication device switches from a cell of the first type to a cell of the second type, wherein attempting to synchronize the second list with the third list comprises:

receiving the second list of settings from the second network node;

comparing the settings of the second list with the settings of the third list; and for each setting of the second list that is not equal to the corresponding setting of the third list:

attempting to update the setting of the second list at the second network node to equal the setting of the third list; or updating the setting of the third list to equal the setting of the second list.

2. The method according to claim 1, wherein attempting to update the setting of the third or second list comprises:

sending a setting synchronization message indicative of the setting of the third list to the second network node;

receiving a setting synchronization response message from the second network node indicative of whether or not the setting of the second list has been updated to equal the setting of the third list; and updating the setting of the third list to equal the setting of the second list in response to the setting of the second list not having been updated to equal the setting of the third list.

3. The method according to claim 1, further comprising, in response to the setting of the third list being updated to equal the setting of the second list, rendering, via a user interface, a notification indicative of the updated the setting of the third list.

4. The method of claim 1, wherein keeping the third list of settings comprises, when the wireless communication device is operating in association with a cell of the first type:

sending a setting update message indicative of a new setting of the supplementary services to the first network node;

receiving a setting update response message from the first network node indicative of whether or not the setting of the first list has been updated to equal the new setting; and updating the setting of the third list to equal the new setting in response to the setting of the first list having been updated to equal the new setting.

5. The method of claim 1, wherein keeping the third list of settings comprises, when the wireless communication device initiates operation in association with the cellular communication network supporting supplementary services and when the wireless communication device is operating in association with a cell of the first type:

receiving the first list of settings from the first network node; and initiating the settings of the third list to equal the settings of the first list.

6. The method according to claim 1, further comprising synchronizing the first list with the third list when the wireless communication device switches from a cell of the second type to a cell of the first type.

7. The method according to claim 1, wherein:

the first communication protocol is an Extensible Markup Language (XML) Configuration Access Protocol (XCAP) protocol as defined in Technical Specification 24.623 of the Third Generation Partnership Project and the second communication protocol is a layer three radio protocol for configuration of supplementary services as defined in Technical Specification 24.010 of the Third Generation Partnership Project, or vice versa.

8. A nontransitory computer readable storage medium, having thereon a computer program comprising program instructions, the computer program being loadable into a data-processing unit and configured to cause execution of a method when the computer program is run by the data-processing unit, wherein the method is of a wireless communication device configured to operate in association with a cellular communication network supporting supplementary services, wherein:

the wireless communication device is configured to configure settings of the supplementary services using a first communication protocol in cooperation with the cellular communication network that further comprises a first network node configured to store, for one or more cells of a first type of the cellular communication network, a first list of settings of the supplementary services configured using the first communication protocol, the wireless communication device is configured to configure settings of the supplementary services using a second communication protocol in cooperation with the cellular communication network that further comprises a second network node configured to store, for one or more cells of a second type of the cellular communication network, a second list of settings of the supplementary services configured using the second communication protocol, the method comprising:

keeping, in the wireless communication device, a third list of settings of the supplementary services configured by the wireless communication device; and attempting to synchronize the second list such that it contains substantially the same supplementary services settings as the third list when the wireless communication device switches from a cell of the first type to a cell of the second type, wherein attempting to synchronize the second list with the third list comprises:

receiving the second list of settings from the second network node;

comparing the settings of the second list with the settings of the third list; and for each setting of the second list that is not equal to the corresponding setting of the third list:

attempting to update the setting of the second list at the second network node to equal the setting of the third list; or updating the setting of the third list to equal the setting of the second list.

9. An arrangement for a wireless communication device configured to operate in association with a cellular communication network supporting supplementary services, wherein:

the cellular communication network comprises a first network node configured to store, for one or more cells of a first type of the cellular communication network, a first list of settings of the supplementary services configured by the wireless communication device using a first communication protocol, the cellular communication network comprises a second network node configured to store, for one or more cells of a second type of the cellular communication network, a second list of settings of the supplementary services configured by the wireless communication device using a second communication protocol, the arrangement comprising a supplementary services control unit configured to cause:

configuration of settings of the supplementary services by use of the first communication protocol;

configuration of settings of the supplementary services by use of the second communication protocol;

keeping, in a storage unit, of a third list of settings of the supplementary services configured by the wireless communication device; and an attempt to synchronize the second list such that it contains substantially the same supplementary services settings as the third list when the wireless communication device switches from a cell of the first type to a cell of the second type, wherein the supplementary services control unit is configured to cause the attempt to synchronize the second list with the third list by:

causing a transceiver to receive the second list of settings from the second network node;

comparing the settings of the second list with the settings of the third list; and for each setting of the second list that is not equal to the corresponding setting of the third list, cause:

attempting to update the setting of the second list at the second network node to equal the setting of the third list; or updating of the setting of the third list to equal the setting of the second list.

10. The arrangement according to claim 9, wherein the supplementary services control unit is configured to update the setting of the third or second list by:

causing the transceiver to send a setting synchronization message indicative of the setting of the third list to the second network node;

causing the transceiver to receive a setting synchronization response message from the second network node indicative of whether or not the setting of the second list has been updated to equal the setting of the third list; and updating the setting of the third list to equal the setting of the second list in response to the setting of the second list not having been updated to equal the setting of the third list.

11. The arrangement according to claim 9, wherein the supplementary services control unit is further configured to, in response to the setting of the third list being updated to equal the setting of the second list, cause rendering, via a user interface, a notification indicative of the updated the setting of the third list.

12. The arrangement of claim 9, wherein the supplementary services control unit is further configured to, when the wireless communication device is operating in association with a cell of the first type:

cause the transceiver to send a setting update message indicative of a new setting of the supplementary services to the first network node;

cause the transceiver to receive a setting update response message from the first network node indicative of whether or not the setting of the first list has been updated to equal the new setting; and update the setting of the third list to equal the new setting in response to the setting of the first list having been updated to equal the new setting.

13. The arrangement of claim 9, wherein the supplementary services control unit is further configured to, when the wireless communication device initiates operation in association with the cellular communication network supporting supplementary services and when the wireless communication device is operating in association with a cell of the first type:

cause the transceiver receive the first list of settings from the first network node; and initiate the settings of the third list to equal the settings of the first list.

14. The arrangement according to claim 9, wherein the supplementary services control unit is further configured to cause synchronization of the first list with the third list when the wireless communication device switches from a cell of the second type to a cell of the first type.

15. A wireless communication device comprising the arrangement according to claim 9.

* * * * *